July 2, 1968     W. HESSLENBERG     3,390,490
DEVICE FOR PROCESSING SURFACES
Filed Sept. 16, 1965
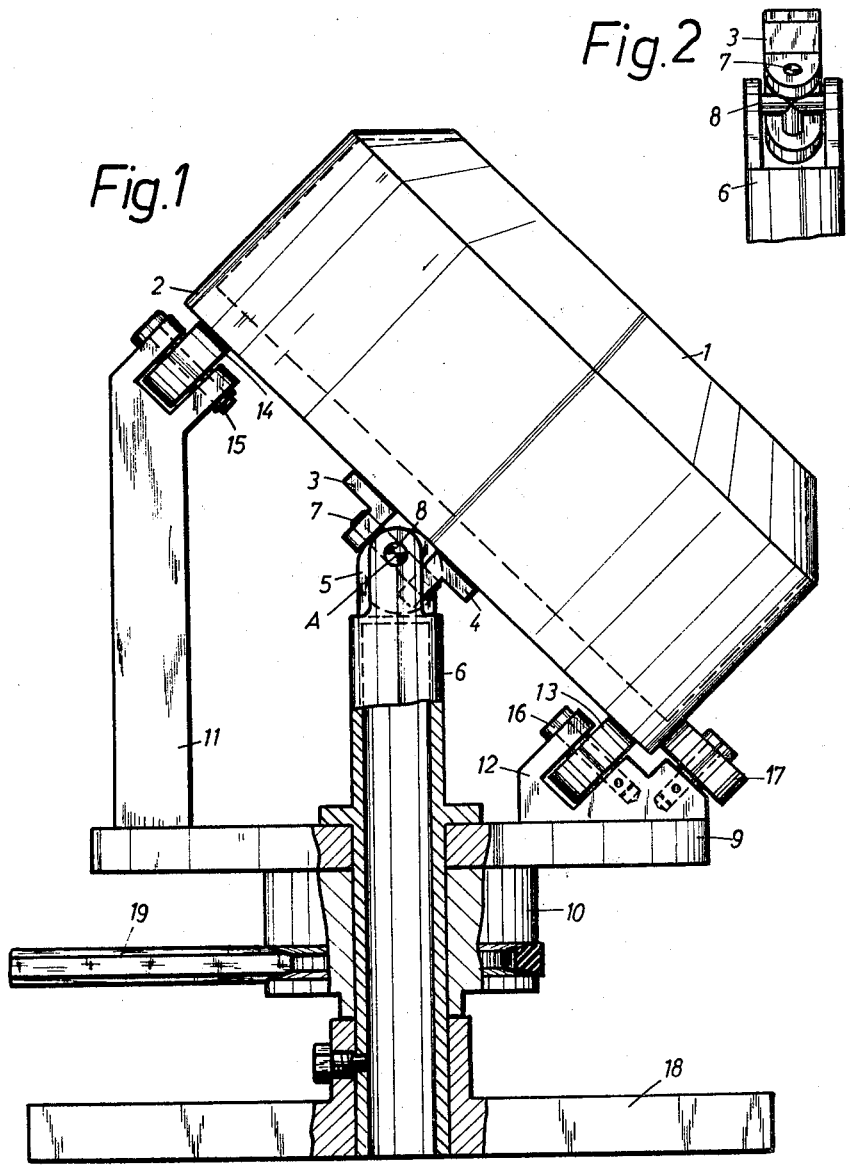
INVENTOR.
WERNER HESSLENBERG
BY
ATTORNEYS 3,390,490
Patented July 2, 1968

3,390,490
DEVICE FOR PROCESSING SURFACES
Werner Hesslenberg, Wuppertal-Elberfeld, Germany, assignor to Walther-Technik Carl Kurt Walther, Wuppertal-Vohwinkel, Germany
Filed Sept. 16, 1965, Ser. No. 487,718
Claims priority, application Germany, Sept. 19, 1964, W 37,577
1 Claim. (Cl. 51—163)

ABSTRACT OF THE DISCLOSURE

A processing device for finishing articles including a container supported upon a stationary vertical support by means of a universal joint and having a pair of support rollers vertically spaced from each other on opposite sides of the bottom of the container and a transverse roller engaging the side of the container. The rollers are supported upon rotary means and rotation of the rotary support element causes the container to move about the universal joint to tumble the contents.

---

This invention relates to a device for processing surfaces and more particularly to a device for grinding, polishing or coating the surfaces of certain products.

Many manufacturing processes produce products that must have their surfaces ground, polished or coated before they may be put to their ultimate use. It has been known for some years to employ a tumbler device in which the products are placed along with abrasive or coating materials. Usually, a tumbler consists of a drum which revolves around a horizontal axis, tumbling the products along with whatever working material is used.

Grinding or polishing of product surfaces is accomplished by placing agents of the proper abrasiveness into a tumbler with the products. In tumbling, the abrasive agents move against the product surfaces, removing rough portions and polishing the surfaces.

Coating is similarly accomplished. Products are tumbled with a desired coating agent which is usually in liquid form. Amount of coating action is controlled by fixing the length of time the products are in the tumbler.

Drum tumblers, which are generally used in the prior art, present a constantly changing inclined plane to products and the grinding or coating agents. The majority of the tumbling action occurs at the high point of the incline to which the products and agents travel. Most of the products lie behind this point and have little or no relative movement with respect to the working agents at any one instant. Consequently, only a small proportion of the products are being worked upon at any given time. Other tumblers in the prior art have taken the form of open troughs which usually are moved in small flat circular paths. These devices are less efficient than the present invention and produce heavy stresses in both the tumbler and the products.

It is an object of this invention to provide a tumbler device which will operate more efficiently than pre-existing devices, allowing the working agents to work upon the majority or all of the products at any one time.

It is a further object of the invention to provide a tumbler device which will produce desired surfaces on products at a higher rate than heretofore possible.

In accordance with this invention, products with the proper working agent are placed into a flat bottomed circular container. The container is connected at the center portion of its bottom to a fixed vertical shaft by means of a universal joint. The container is thereby free to move angularly about the upper end of the shaft on two orthogonal axes.

Driving mechanisms cause the container to constantly move angularly about the end of the shaft. Accordingly, products and the working agent encounter a constant and equally changing slope at all points in the container. In this way, the majority or all of the products constantly move relative to the working agent, moving through a smooth figure eight course. As a result, the products are processed more efficiently and more quickly than is possible with present tumblers.

Objects of this invention may be readily understood by reference to the following detailed description and to the drawings, wherein:

FIG. 1 is an illustration, partly in cross-section, of the overall device according to this invention; and FIG. 2 is a detailed view of the single universal joint utilized in this invention.

Referring to FIG. 1, a preferred embodiment of the invention is shown wherein container 1 is provided for tumbling products and working agents. Container 1 is open at the top and closed at its lower end by flat surface 2. Angle brackets 3, 4 fastened to the center portion of flat surface 2 rotatively connect the container to cross shaft 7 of a single universal joint 5. Second cross shaft 8, connected at its mid-portion to cross shaft 7 is journaled at each end to ear portions of vertical member 6. Since each cross shaft is rotatively held in universal joint 5, container 1 is free to move angularly about the upper end of vertical member 6 about orthogonal axes defined by the cross shafts 7, 8. Vertical member 6 is secured in any well known fashion to base 18.

Circular drive plate 9, connected integrally to drive pulley 10, is rotatively mounted on vertical member 6. V-belt 19, powered by a source not shown, causes drive plate 9 to rotate around fixed vertical member 6 when the device is in operation.

At one edge of drive plate 9, vertical support 11 rises for a distance greater than the length of vertical member 6 above the plate. In the preferred embodiment of this invention, the top end of support 11 is angled inwardly toward member 6 and slotted to receive roller 14, held therein by bolt 15.

Opposite support 11, a second support 12 is connected to drive plate 9. Support 12 is notched to receive roller 13 held therein by pin 16.

Both supports and rollers are sized such that container 1 is maintained at an angle as illustrated in the darwing. Since the weight of products and working agents tumbled in container 1 would push the container parallel to the axis of rollers 13 and 14, support 12 is provided with roller 17 which maintains container 1 properly centered with respect to universal joint 5.

FIG. 2 illustrates universal joint 5 in detail. As explained above, cross shafts 7, 8 are joined at their mid-portions. The ends of each cross shaft are journaled in angle brackets 3, 4 and the ears of vertical shaft 6.

In practicing the invention described above, it has been found that usual process times have been reduced at least two-thrids. Moreover, surfaces imparted to the products are considerably improved. It is believed that the tumbler described herein results in maximum possible relative movement between products and the working agent.

As may be readily appreciated by those skilled in the art, changes in the structure of the preferred embodiment described herein may be made without departing from the spirit of this invention. For example, multiple rollers could be substituted for the single rollers shown. Or, sliding members could be used in place of the rollers. Further, this invention may be utilized for other purposes such as mixing. It is intended that the invention be limited only by the following claim.

What is claimed is:
1. In a device for processing surfaces, the combination comprising
- a base element including a vertically extending member,
- connecting means including a universal joint fixedly attached to said vertical member at its upper end,
- circular container means open at its upper end and closed at its lower end by a flat surface, said container means fixedly attached to said connecting means at the center portion of said flat surface, said universal joint permitting orthogonal angular movement about the upper end of said vertical member,
- circular drive means rotatively mounted on said vertical member intermediate its end portion for rotation in a plane perpendicular to said member,
- a first support member extending upwardly from a first peripheral portion of said drive means,
- a first roller rotatively mounted in the upper end of said first support member for movably engaging the peripheral portion of said container means,
- a second support member extending upwardly from a second peripheral portion of said drive means opposite said first portion,
- a second roller rotatively mounted in the upper end of said second support member for movably engaging the peripheral portion of said container means,
- said second support member being longer than said first support member,
- a third support means adjacent the first,
- a third roller means rotatively mounted in the upper end of said third support means, the axis of rotation of said third roller means being at a right angle to the axis of said first roller means, for movable engaging the side of said circular container means.

References Cited
UNITED STATES PATENTS

| | | | |
|---|---|---|---|
| 59,325 | 10/1866 | Wathew | 259—72 X |
| 1,330,801 | 2/1920 | Greenberg | 259—72 X |
| 2,480,502 | 8/1949 | Nieder | 51—7 X |
| 3,167,890 | 2/1965 | Smith | 51—164 |

HAROLD D. WHITEHEAD, *Primary Examiner.*